Patented Jan. 20, 1931

1,789,903

UNITED STATES PATENT OFFICE

GEORG KALISCHER, OF FRANKFORT-ON-THE-MAIN, AND RICHARD FLEISCHHAUER, OF FRANKFORT-ON-THE-MAIN-FECHENHEIM, GERMANY, ASSIGNORS TO GENERAL ANILINE WORKS, INC., OF NEW YORK, N. Y., A CORPORATION OF DELAWARE

MONO-OXAMIC ACIDS OF 4.4'-DIAMINODIARYLCYCLOHEXANE COMPOUNDS

No Drawing. Application filed August 22, 1929, Serial No. 387,798, and in Germany August 28, 1928.

We have found that mono-oxamic acids of 4.4'-diamino-diaryl-cyclohexane compounds which correspond to the general formula:

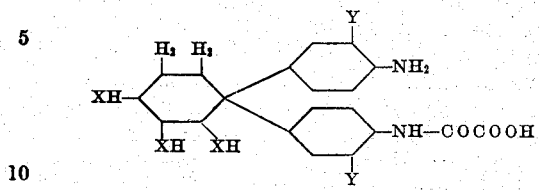

(wherein one X means hydrogen or methyl, the other X's hydrogen and the Y's stand for hydrogen, halogen, methyl- or alkoxy-groups) are obtained by treating with oxalic acid 4.4'-diamino-diaryl-cyclohexane compounds which are described in U. S. application Serial No. 252,941, filed February 8, 1928, and correspond to the general formula:

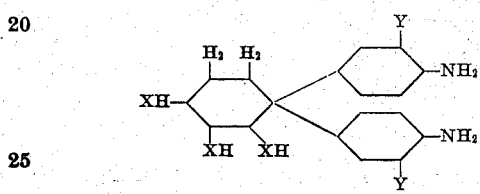

(wherein X and Y have the above signification).

According to our process the starting bases are heated with oxalic acid until they have mostly disappeared. Advantageously this reaction is carried out in the presence of a solvent, as water or an inert organic solvent, care being taken that the quantity of the oxalic acid applied does not substantially surpass that necessary for dissolving the bases.

The mono-oxamic acids are difficultly soluble in water and in organic solvents. Their sodium and potassium salts are difficultly soluble in cold water, more soluble in hot water.

The new products, containing a free amino group capable of being diazotized, are valuable intermediates for the production of dyestuffs.

In order to further illustrate our invention the following examples are given, the parts being by weight and all temperatures in centigrade degrees. But we wish to be understood that we are not limited to the particular conditions nor to the specific products mentioned therein.

Example 1

13.3 parts of 4.4'-diamino-diphenyl-1.1'-cyclohexane, obtainable by condensing 1 molecule of cyclohexanone with 2 molecules of aniline, are boiled under a reflux condenser with 400 parts of water and 13.6 parts of crystallized oxalic acid. From the originally clear solution the formed oxamic acid precipitates gradually as a heavy powder. When its quantity no more increases and the base applied has nearly disappeared, the precipitate is filtered hot and washed with water. For purification it is dissolved at 60–70° in a dilute ammonia solution, filtered if necessary from small amounts of impurities and again precipitated therefrom while warm by means of an acid.

The new mono-oxamic acid corresponds to the formula:

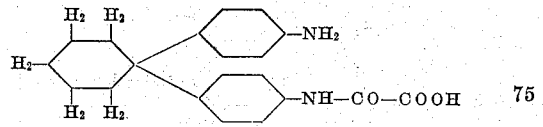

It represents a nearly white powder, melting when crystallized from spirit at about 218° while decomposing. It forms an easily soluble ammonium salt, but difficultly soluble sodium and potassium salts.

From the above mentioned filtrate of the mono-oxamic acid the unchanged starting material may be isolated by the addition of ammonia or the filtrate may be directly used for the same process.

Example 2

14.7 parts of 4.4'-diamino-3.3'-dimethyl-diphenyl-cyclohexane, 16 parts of crystallized oxalic acid and 400 parts of water are boiled for about 24 hours. The mass is worked up as described in Example 1. The new 4-amino-3.3'-dimethyl-diphenyl-cyclohexane-4'-oxamic acid thus obtained corresponds to the formula:

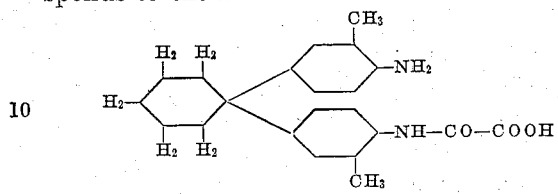

It shows similar properties as the product of Example 1. It crystallizes from alcohol in white crystals melting at about 216° while decomposing.

When the filtrate of the mono-oxamic acid is added to a new starting mixture the yield of mono-oxamic acid becomes nearly quantitative.

A similar product is obtained by starting from 4.4'-diamino-3.3'-dimethyl-diphenyl-4''-methyl-cyclohexane and oxalic acid. It corresponds to the formula:

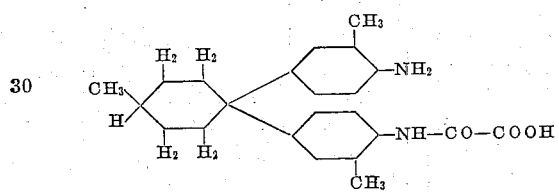

Example 3

16.3 parts of 4.4'-diamino-3.3'-dimethoxy-diphenyl-cyclohexane, 17 parts of crystallized oxalic acid and 400 parts of water are boiled for about 24 hours. Then the mass is worked up as described above. The new 4-amino-3.3'-dimethoxy-diphenyl-cyclohexane-4'-oxamic acid thus obtained corresponds to the formula:

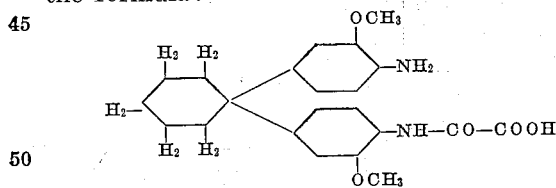

It represents a light grey to colorless powder, easily soluble in ammonia solution and in cyclohexanone, difficultly soluble in alcohol, insoluble in water. When heated above 200° it decomposes while becoming brown.

Likewise 4.4'-diamino-3.3'-diethoxy-diphenyl-cyclohexane yields 4-amino-3.3'-diethoxy-cyclohexane-4'-oxamic acid which shows similar properties.

Example 4

4.4'-diamino-3.3'-dichloro-diphenyl-cyclohexane is treated with oxalic acid in the manner described in the foregoing examples. Thereby 4-amino-3.3'-dichloro-diphenyl-cyclohexane-4'-oxamic acid is obtained which corresponds to the formula:

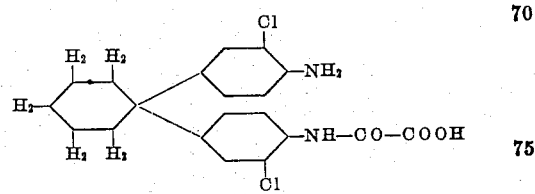

It shows similar properties as the products of the foregoing examples.

In an analogous manner 4-amino-3.3'-dibromo-diphenyl-cyclohexane-4'-oxamic acid is obtained by starting from 4.4'-diamino-3.3'-dibromo-diphenyl-cyclohexane.

Example 5

13 parts of crystallized oxalic acid are added to a solution of 13.3 parts of 4.4'-diamino-diphenyl-cyclohexane in 50 parts of monochloro-benzene and the mixture is heated under a reflux condenser for some hours. Then the solvent is removed by steam distillation, the remaining mass is dissolved in a dilute ammonia solution and filtered. From the filtrate 4-amino-diphenyl-cyclohexane-4'-oxamic acid is precipitated by the addition of hydrochloric acid. It is identical to the product of Example 1.

We claim:—

1. A process which comprises treating a 4.4'-diamino-diaryl-cyclohexane compound of the general formula:

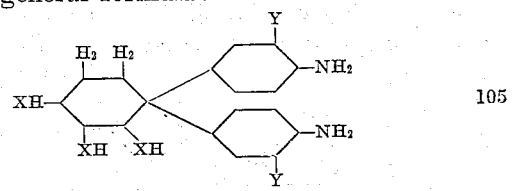

(wherein one X means hydrogen or methyl, the other X's hydrogen and the Y's stand for hydrogen, halogen, methyl- or alkoxy-groups) with oxalic acid.

2. A process which comprises treating a 4.4'-diamino-diaryl-cyclohexane compound of the general formula:

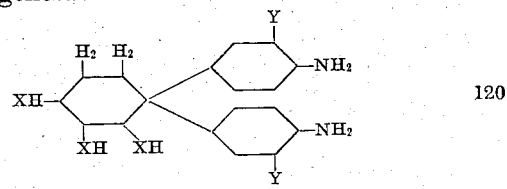

(wherein one X means hydrogen or methyl, the other X's hydrogen and the Y's stand for hydrogen, halogen, methyl or alkoxy groups) with oxalic acid in the presence of a diluent until the base has mostly disappeared.

3. A process which comprises treating a 4.4′-diamino-diaryl-cyclohexane compound of the general formula:

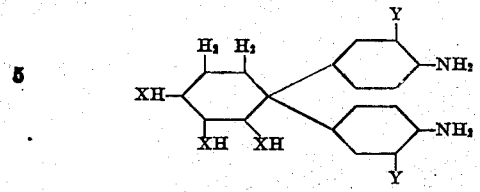

(wherein one X means hydrogen or methyl, the other X's hydrogen and the Y's stand for hydrogen, halogen, methyl or alkoxy groups) with oxalic acid in the presence of water until the base has mostly disappeared, care being taken that the quantity of the oxalic acid applied does not substantially surpass that necessary for dissolving the base applied.

4. As new compounds the mono-oxamic acids of 4.4′-diamino-diaryl-cyclohexane compounds corresponding to the general formula:

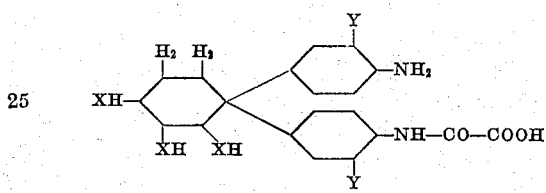

(wherein one X means hydrogen or a methyl group, the other X's hydrogen, the Y's stand for hydrogen, halogen, methyl or alkoxy groups), which compounds are nearly white substances, difficultly soluble in water and in organic solvents, forming sodium and potassium salts which are difficultly soluble in cold water, more soluble in hot water, capable of being diazotized and yielding by saponifying agents 4.4′-diamino-diaryl-cyclohexane compounds.

5. As a new compound 4-amino-3.3′-dimethyl-diphenyl-cyclohexane-4′-oxamic acid of the formula:

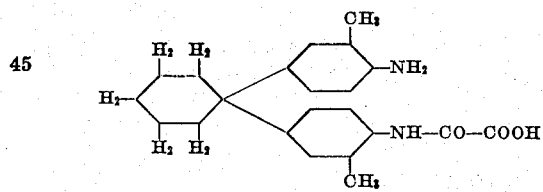

which compound is a nearly white substance, melting when recrystallized from alcohol at about 216°, difficultly soluble in water and in organic solvents, forming sodium and potassium salts which are difficultly soluble in cold water, more soluble in hot water, capable of being diazotized and yielding by saponifying agents 4.4′-diamino-3.3′-dimethyl-diphenyl-cyclohexane.

In testimony whereof, we affix our signatures.

GEORG KALISCHER.
RICHARD FLEISCHHAUER.